United States Patent
Chang

(10) Patent No.: US 9,250,681 B2
(45) Date of Patent: Feb. 2, 2016

(54) INFRARED REFLECTION BASED COVER DETECTION

(71) Applicant: barnesandnoble.com llc, New York, NY (US)

(72) Inventor: Songan Andy Chang, Mountain View, CA (US)

(73) Assignee: NOOK DIGITAL, LLC, New York, NY (US)

( * ) Notice: Subject to any disclaimer, the term of this patent is extended or adjusted under 35 U.S.C. 154(b) by 72 days.

(21) Appl. No.: 13/659,710

(22) Filed: Oct. 24, 2012

(65) Prior Publication Data

US 2013/0100160 A1 Apr. 25, 2013

Related U.S. Application Data

(60) Provisional application No. 61/551,350, filed on Oct. 25, 2011.

(51) Int. Cl.
*G06F 3/02* (2006.01)
*G06F 1/32* (2006.01)
*G06F 3/042* (2006.01)

(52) U.S. Cl.
CPC .............. *G06F 1/3206* (2013.01); *G06F 3/042* (2013.01); *G09G 2330/021* (2013.01)

(58) Field of Classification Search
CPC ....................................................... G06F 1/3206
See application file for complete search history.

(56) References Cited

U.S. PATENT DOCUMENTS

| | | | |
|---|---|---|---|
| 7,750,282 B2 * | 7/2010 | Mahowald et al. | ..... 250/214 AL |
| 7,945,794 B2 | 5/2011 | Chen | |
| 8,046,617 B2 * | 10/2011 | Fleck et al. | .................... 713/324 |
| 2004/0150958 A1 | 8/2004 | Calhoon | |
| 2006/0135226 A1 | 6/2006 | Won et al. | |
| 2010/0159998 A1 | 6/2010 | Luke et al. | |
| 2010/0289752 A1 | 11/2010 | Birkler | |
| 2011/0061947 A1 | 3/2011 | Krah et al. | |

* cited by examiner

*Primary Examiner* — Jason Olson
(74) *Attorney, Agent, or Firm* — Winston & Strawn LLP

(57) ABSTRACT

A system and method for improving power consumption by providing the ability to detect whether a cover is placed on top of Infrared, IR, touch device. While the cover is in the open state, a certain amount of the light transmitted by the IR transmitters is directed upward and away from the IR receivers in the device. When the cover is closed, this light is reflected off of the cover and is incident on the IR receivers. The system of the present invention recognizes this increased level of received IR light and determines that the cover is in a closed position. Having made such a determination that the cover is placed on the device, the device's power savings system can switch to an appropriate power saving mode.

12 Claims, 4 Drawing Sheets

INFRARED REFLECTION BASED COVER DETECTION

CROSS-REFERENCE TO RELATED APPLICATION

This application claims benefit of U.S. Provisional Application No. 61/551,350, filed Oct. 25, 2011, which is hereby incorporated by reference.

FIELD OF THE INVENTION

The present invention generally relates power saving systems for mobile devices and more particularly, to systems for detecting the closure of a cover on a mobile device.

BACKGROUND OF THE INVENTION

Compact and lightweight notebook, laptop computers have become increasingly popular due to their portability. In general, such a portable computer is composed of a main body having a keyboard and a lid, where the lid is hingedly attached to the main body of the portable computer. A flat panel display is typically mounted on the lid. Or in some instances it could be said that the flat panel display forms a lid covering the keyboard of the main body. Usually, the lid is closed when the portable computer is not in use. Many of these devices include mechanisms, typically mechanical, to detect the closure of the lid. These detection mechanisms are tied to power saving circuitry, hardware or software, to effectuate a power savings mode when the lid is detected as closed. Similar detection and power savings mode have been employed in flip phones.

However, the aforementioned mechanical lid detection mechanism do not work for tablet type devices that do not have an integrated cover.

SUMMARY OF THE INVENTION

The present invention helps improve power consumption by providing the ability to detect whether a cover is placed on top of Infrared, IR, touch device such as an eReader or a tablet device. While the cover is in the open state, a certain amount of the light transmitted by the IR transmitters is directed upward and away from the IR receivers in the device. When the cover is closed, this light is reflected off of the cover and is incident on the IR receivers. The system of the present invention recognizes this increased level of received IR light and determines that the cover is in a closed position. Having made such a determination that the cover is placed on the device, the device's power savings system can switch to an appropriate power saving mode.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

The present inventor discovered that there is a clear difference in IR level reading on a touch screen device when the device's display is covered and uncovered. Further investigation revealed that the increased IR levels were due to reflection off of the cover of the device when it was in a closed state. It was recognized that this behavior can be exploited to serve as a mechanism to detect whether a cover is in a closed or opened state, without additional hardware, and thus improve power savings in a mobile device.

In the preferred embodiment, the touch screen device is a tablet device, preferably an e-Reader device. Although these devices typically do not have an integrated cover, many users purchase a protective cover as an accessory to protect the device. These protective covers can take several forms such as a sleeve or a portfolio type cover.

The present invention provides a simple and inexpensive mechanism to detect whether a cover is on or off of a device equipped with an optical touch interface such as an IR based touch interface. The ability to detect when the cover is closed reduces power consumption. Power consumption can be reduced by automatically switching the device to low-power mode when the cover is detected to be in the closed position, without any user action required. This convenient automation saves the user time by not having to manually press a button, mechanical or virtual, to suspend the device into the power savings mode. Further it saves power by switching into the power savings mode more quickly than the conventional time-out mechanisms, which wait for a predetermined amount of time without a user input to switch into the power savings mode.

Figure 1:
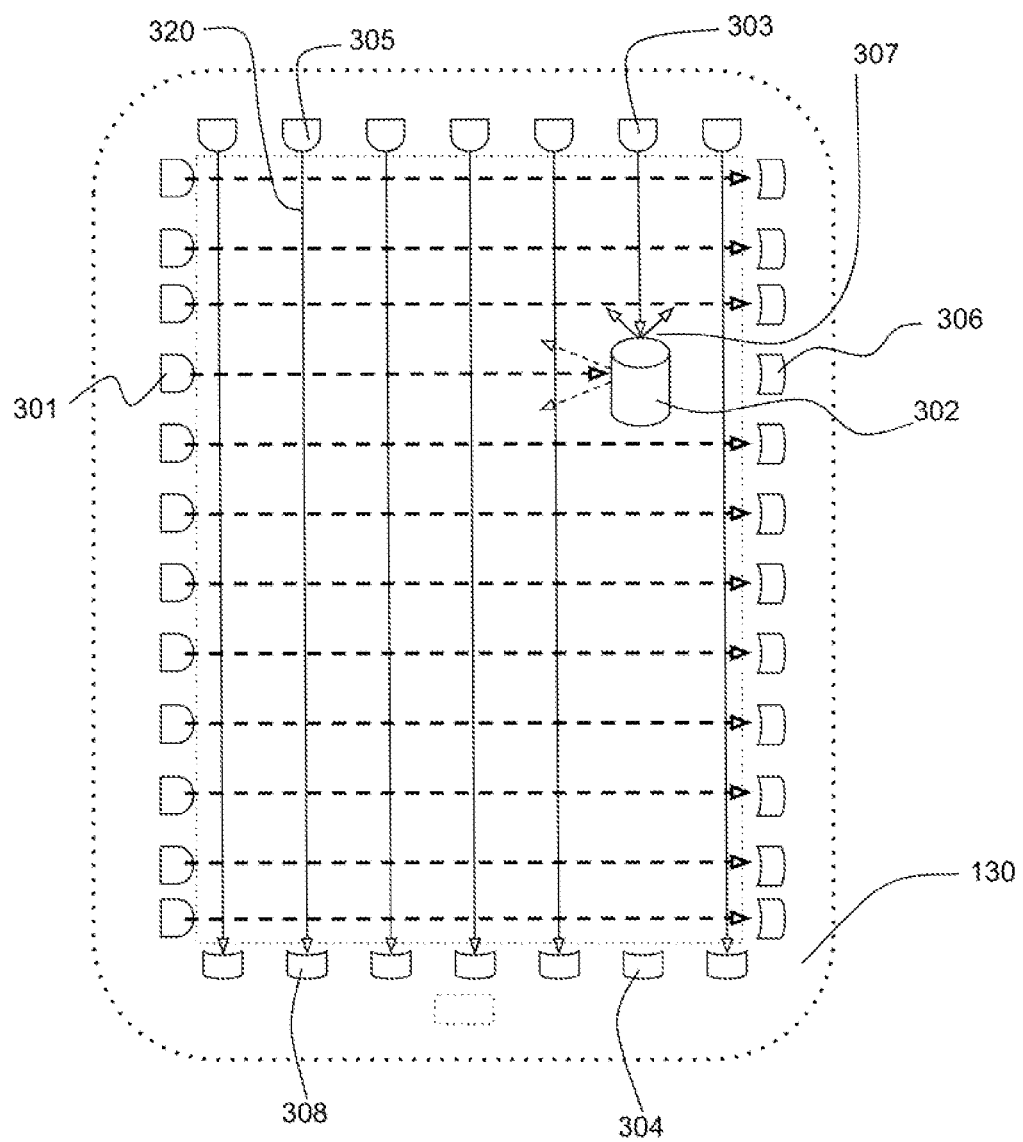
FIG. 1 illustrate a touch screen device with an IR detection system.

FIG. 1 depicts a basic IR-based touch system on a device 130. IR Light Emitting Diodes, LEDs, e.g., 301, 303, 305, and photodiodes (PD), e.g., 304, 306, 308, work together to detect touch objects 302 which are typically a finger or stylus. The IR LEDs are located on two adjacent sides of the device 130, while the PDs are located on the opposite sides of the device 130 to detect the light emitted by the LEDs.

An IR LED, e.g., 305, emits and IR beam 320 and a photodiode, e.g., 308, detects the beam 320. This is the case when there is nothing touching the display, i.e., no touch object 302 to block the IR light beam 320. However, when a user touches the screen using a finger or another touch object 302, IR light from LED 303 is blocked by the object 302 and redirects the IR light 307 away from PD 304. As a result of object 302 blocking the light from LED 303, PD 304 detects a significant drop in the light level. At the same time, a similar scenario is happening on the y-axis: Light emitted by LED 301 is blocked by the touch object, e.g., finger or stylus, 302 resulting in a huge drop in the light level reading at PD 306. Based on the detection of the absence of light by PDs 304 and 306, the system can determine the x and y coordinate location of the touch of object 302.

The present invention operates on the basis that when a cover is placed over the touch surface of the device 130, light emitted by the LEDs that is normally not detected by photodiodes, is redirected by the cover and eventually onto photodiodes PD.

Figure 2:
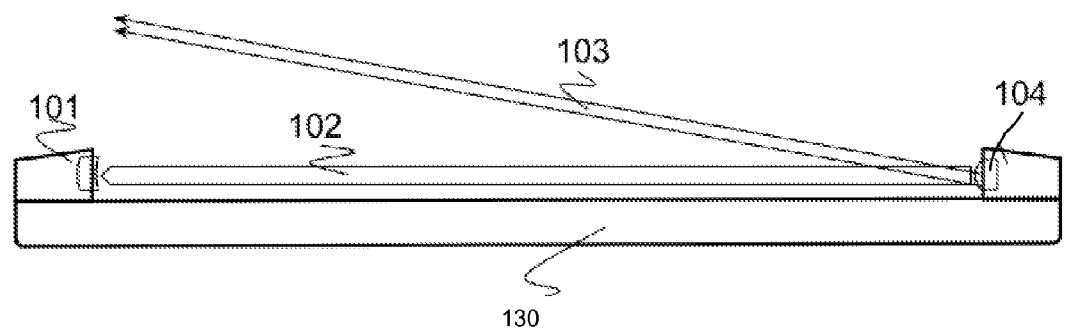
FIG. 2 depicts a device incorporating the present invention with the cover in an open state.

FIG. 2 illustrates the operation of the system of the present invention when a cover (106 in FIG. 3) is not covering the device 130, e.g., in an open position. As illustrated in this Figure, while most of the light 102 emitted from LED 104 hits PD 101 there are scatter light beams 103 from LED 104 never reach photodiode 101.

Figure 3:
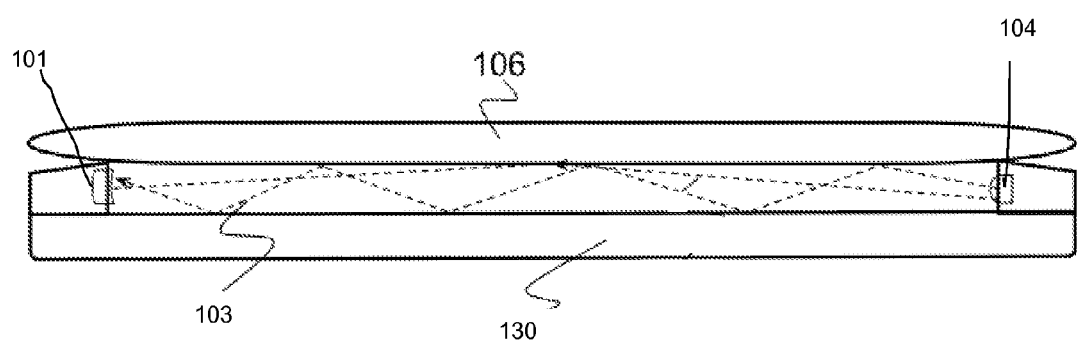
FIG. 3 depicts a device incorporating the present invention with the cover in a closed state.

However, when the cover 106 is place on the device 130, e.g., in a closed position, as depicted in FIG. 3, the scatter light beams 103 now bounce off the cover 106 and make their way onto photodiode 101 on the other side. As a result, the photodiodes detect an IR reading in both x-axis and y-axis that is elevated from the state when the cover 106 is not present. Once the system detects the elevated levels of detected IR light, it determines that the cover has been closed on top of the device 130 and informs the power saving module to go into a power saving mode.

As appreciated by those skilled in the art, approximately the same result of increased light detection will occur if the user places the device 130, screen side down on a flat surface, e.g., a desk or table top. Like a cover, the desktop will reflect the light back toward the screen and the detectors and result in a greatly increased proportion of detected light. The present invention thus allows the user to place the device 130 face down on a table top in order to invoke the power saving mode without having to close a cover over the screen of the device 130.

In an alternative embodiment of the present invention, the cover 106 actually has an extension that protrudes toward the screen of the device 130 and blocks the light from LEDs 104 from reaching photo detectors 101. This is essentially the opposite of the embodiment described above in which the light is greatly increased by the closing of the cover in order to invoke the power saving mode. In the this alternative embodiment, the cover blocks substantially all of the light from the LEDs 104 so that there is a substantial decrease in the light detected by the PDs 106. The percentage of light blocked by the cover projection is significantly greater that any normal object detection, e.g., a finger. The system of the present invention interprets this greatly diminished light detection as an indication that the special cover has been closed and accordingly enters the power saving mode.

Figure 4:
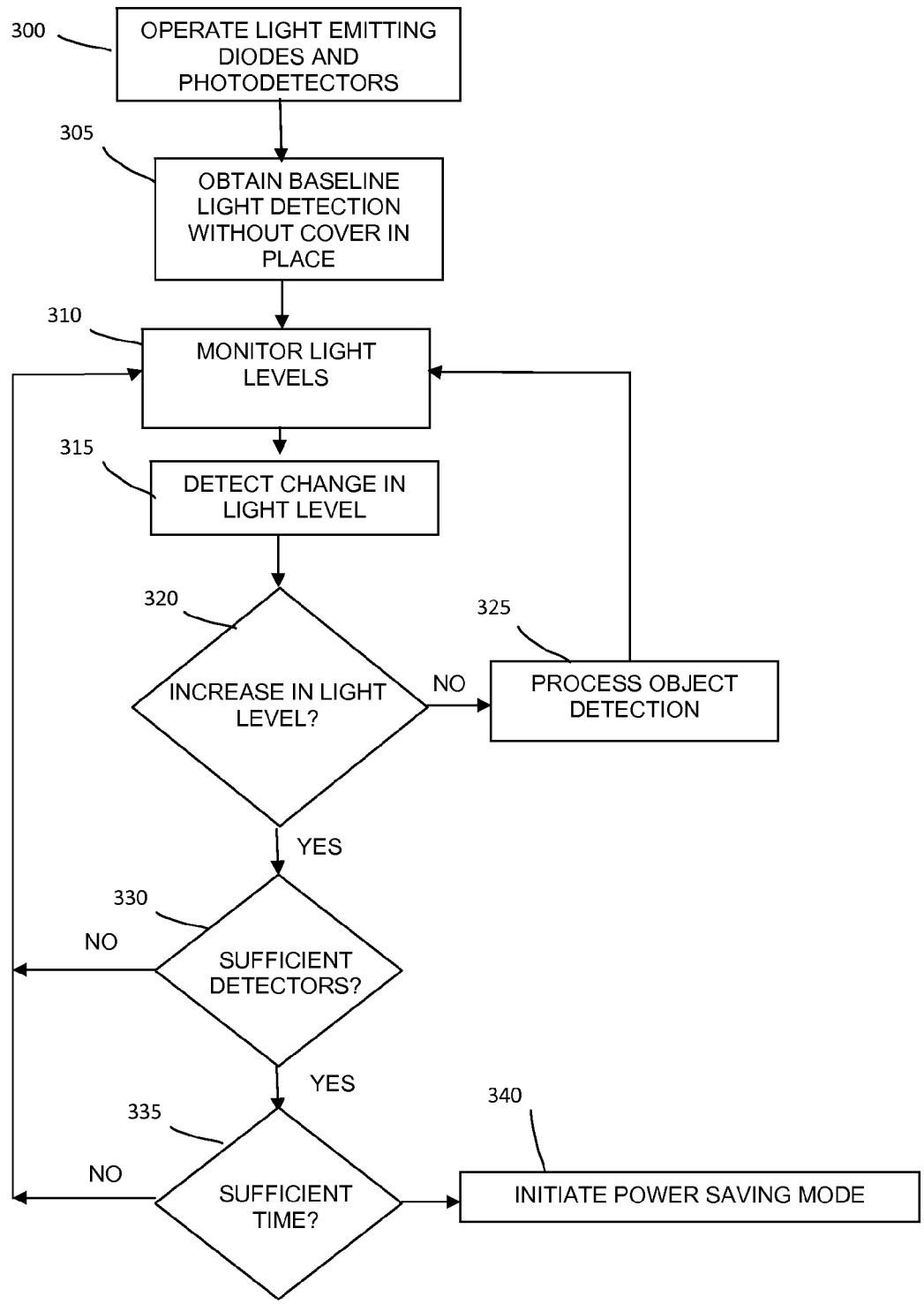
FIG. 4 is a flow chart illustrating a method an embodiment of the present invention.

FIG. 4 is a flowchart depicting a preferred embodiment of the method of the present invention. In act 300, the LEDs and PDs in the device 130 are activated and begin operating. Typically this act occurs when the device is turned on or 'woken up' from a power savings sleep state. In act 305, the system obtain s baseline of light received by the PDs in a nominal state when there is no cover in place. This baseline is preferably established when the device 130 is turned on, woken up and periodically to take into account environmental conditions that may effect the IR detection, e.g., temperature. Changes in ambient light, e.g., going from indoors to sunlight outdoors, would not typically effect the IR detection as the system is tuned to transmit and receive IR frequencies that do not change with changing ambient conditions.

In step 315, the main routine starts with the system monitoring the light levels detected by the PDs for changes in these levels. In act 315, a change in a light level is detected. In act 320 is determined if the change is an increase or a decrease in the light level. If the change is a decrease in the detected light levels, the assumption is that an object, e.g., a user's finger, is blocking the light and in act 325, the normal processing for touch detection takes place.

If there is an increase in the detected light level, the system then determines if was caused by a cover being placed over the device. Two ways the system accomplishes this is ensure that the increase in detected light level is substantially uniform over the PDs, act 330, and that the increased light detection occurs over some predetermined period of time, e.g., 30 seconds, a minute, act 335. These two tests 330 and 335 are intended to filter out spurious, random and isolated increases in the light. For example, if the user momentarily lays her whole hand, or a paper over the device, this will result in a temporary increase in the light detected by a substantial number or perhaps all of the PDs. The system should be able to determine, through the above two tests, that this incident was not the closing of the cover, but some other event.

If it is determined that the increase in light is in fact due to the closing of the cover, the system enters the power savings mode in act 340. The system will stay in this mode until it is reactivated, 'woken up', at which point the process illustrated in this Figure is repeated.

Figure 5:
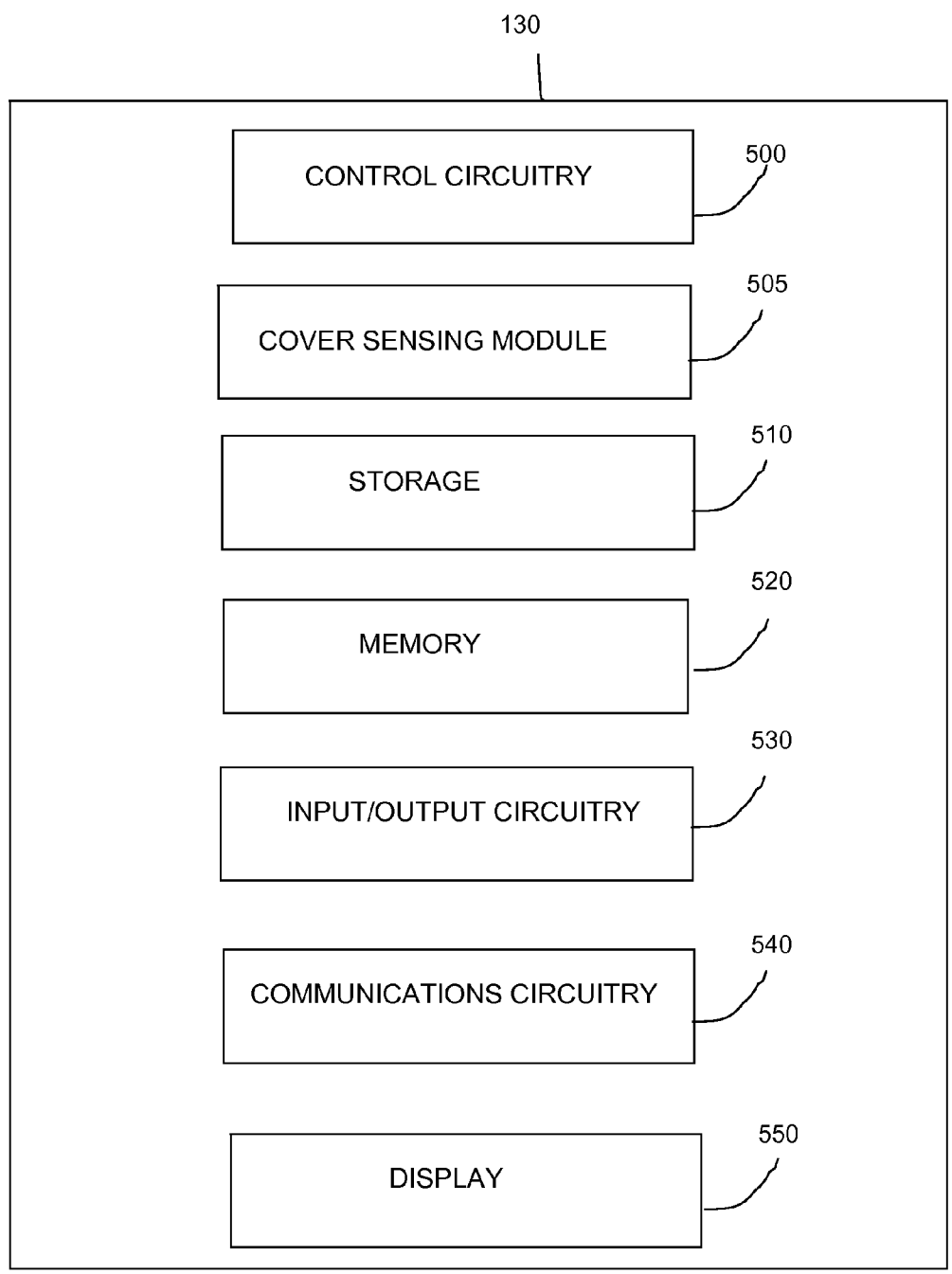
FIG. 5 illustrates the components of an exemplary device.

FIG. 5 illustrates an exemplary device 130 employing the present invention. As appreciated by those skilled the art, the device 130 can take many forms capable of operating the present invention. In a preferred embodiment the device 130 is a mobile electronic device, and in an even more preferred embodiment device 130 is an electronic reader device, such as a tablet device. Electronic device 130 can include control circuitry 500, storage 510, memory 520, input/output ("I/O") circuitry 530, communications circuitry 540, and display 550. In some embodiments, one or more of the components of electronic device 130 can be combined or omitted, e.g., storage 510 and memory 520 may be combined. As appreciated by those skilled in the art, electronic device 130 can include other components not combined or included in those shown in this Figure, e.g., a power supply such as a battery, an input mechanism, etc.

Electronic device 130 can include any suitable type of electronic device. For example, electronic device 130 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 130 can include a larger portable electronic device, such as a laptop computer.

Control circuitry 500 can include any processing circuitry or processor operative to control the operations and performance of electronic device 130. For example, control circuitry 500 can be used to run operating system applications, firmware applications, media playback applications, media editing applications, or any other application. Control circuitry 500 can drive the display 550 and process inputs received from a user interface, e.g., the touch screen display 550.

Cover Sensing component 505 operates as described above to detect the presence and absence of a cover of the device 130. Cover Sensing component 505 operates with the IR sensing capabilities of the touch screen 550, I/O circuitry 530 and control circuitry 500 to place the device 130 in a power savings mode when the Cover Sensing component 505 detects that the cover is closed. The process for effectuating the power savings mode is accomplished by the control circuitry and is well known in the art.

Storage 510 can include, for example, one or more computer readable storage mediums including a hard-drive, solid state drive, flash memory, permanent memory such as ROM, magnetic, optical, semiconductor, paper, or any other suitable type of storage component, or any combination thereof. Storage 510 can store, for example, media content, e.g., eBooks, music and video files, application data, e.g., software for implementing functions on electronic device 130, firmware, user preference information data, e.g., content preferences, authentication information, e.g., libraries of data associated with authorized users, transaction information data, e.g., information such as credit card information, wireless connection information data, e.g., information that can enable electronic device 130 to establish a wireless connection, subscription information data, e.g., information that keeps track of podcasts or television shows or other media a user subscribes to, contact information data, e.g., telephone numbers and email addresses, calendar information data, and any other suitable data or any combination thereof. The instructions for implementing the functions of the present invention may, as non-limiting examples, comprise software and/or scripts stored in the computer-readable media 510

Memory 520 can include cache memory, semi-permanent memory such as RAM, and/or one or more different types of memory used for temporarily storing data. In some embodiments, memory 520 can also be used for storing data used to operate electronic device applications, or any other type of data that can be stored in storage 510. In some embodiments, memory 520 and storage 510 can be combined as a single storage medium.

I/O circuitry 530 can be operative to convert, and encode/decode, if necessary analog signals and other signals into digital data. In some embodiments, I/O circuitry 530 can also convert digital data into any other type of signal, and vice-versa. For example, I/O circuitry 530 can receive and convert physical contact inputs, e.g., from a multi-touch screen, i.e., display 550, physical movements, e.g., from a mouse or sensor, analog audio signals, e.g., from a microphone, or any other input. The digital data can be provided to and received from control circuitry 500, storage 510, and memory 520, or any other component of electronic device 130. Although I/O circuitry 530 is illustrated in this Figure as a single component of electronic device 130, several instances of I/O circuitry 530 can be included in electronic device 130.

Electronic device 130 can include any suitable interface or component for allowing a user to provide inputs to I/O circuitry 530. For example, electronic device 130 can include any suitable input mechanism, such as a button, keypad, dial, a click wheel, or a touch screen, e.g., display 550. In some embodiments, electronic device 130 can include a capacitive sensing mechanism, or a multi-touch capacitive sensing mechanism or an IR sensing mechanism as described above.

In some embodiments, electronic device 130 can include specialized output circuitry associated with output devices such as, for example, one or more audio outputs. The audio output can include one or more speakers, e.g., mono or stereo speakers, built into electronic device 130, or an audio component that is remotely coupled to electronic device 130, e.g., a headset, headphones or earbuds that can be coupled to device 130 with a wire or wirelessly.

Display 550 includes the display and display circuitry for providing a display visible to the user. For example, the display circuitry can include a screen, e.g., an LCD screen, that is incorporated in electronics device 130. In some embodiments, the display circuitry can include a coder/decoder (Codec) to convert digital media data into analog signals. For example, the display circuitry or other appropriate circuitry within electronic device 1 can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 130, information regarding ongoing communications operations, information regarding incoming communications requests, or device operation screens, under the direction of control circuitry 500. Alternatively, the display circuitry can be operative to provide instructions to a remote display.

Communications circuitry 540 can include any suitable communications circuitry operative to connect to a communications network and to transmit communications, e.g., data from electronic device 130 to other devices within the communications network. Communications circuitry 540 can be operative to interface with the communications network using any suitable communications protocol such as, for example, Wi-Fi, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VoIP, or any other suitable protocol.

Electronic device 130 can include one more instances of communications circuitry 540 for simultaneously performing several communications operations using different communications networks, although only one is shown in this Figure to avoid overcomplicating the drawing. For example, electronic device 130 can include a first instance of communications circuitry 540 for communicating over a cellular network, and a second instance of communications circuitry 540 for communicating over Wi-Fi or using Bluetooth. In some embodiments, the same instance of communications circuitry 540 can be operative to provide for communications over several communications networks.

In some embodiments, electronic device 130 can be coupled to a host device such as remote servers for data transfers, synching the communications device, software or firmware updates, providing performance information to a remote source, e.g., providing riding characteristics to a remote server, or performing any other suitable operation that can require electronic device 130 to be coupled to a host device. Several electronic devices 130 can be coupled to a single host device using the host device as a server. Alternatively or additionally, electronic device 130 can be coupled to several host devices, e.g., for each of the plurality of the host devices to serve as a backup for data stored in electronic device 130.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. A method for controlling a initiating a power saving mode on an electronic device, the electronic device having light emitters and light detectors for detecting the presence of an object on a screen of the electronic device, the method comprising:
   operating the light emitters and light detectors;
   establishing a baseline of light detected by the light detectors in the absence of an object on the screen and in the absence of a cover on the electronic device;
   detecting a change in the light detected by the light detectors;
   determining if the change in the light detected by the light detectors is an increase in the level of light;
   if the change in detected light is an increase, determining if the increase is due to a cover being placed on the electronic device by determining if a predetermined number of light detectors detected an increase; and
   if the increase is due to a cover being placed on the electronic device, initiating the entry of the power savings mode.

2. The method according to claim 1, wherein the act of determining if the increase is due to a cover being placed on the electronic device further comprises:

determining if the increase was detected for at least a predetermined amount of time.

3. The method according to claim 1, wherein the act of determining if the increase is due to a cover being placed on the electronic device further comprises:
   determining if the increase in light detected by the predetermined number of light detectors was detected for at least a predetermined amount of time.

4. The method according to claim 1, further comprising:
   if the change in detected light is a decrease, performing object detection processing.

5. A non-transitory computer-readable media comprising a plurality of instructions that, when executed by at least one electronic device, cause the at least one electronic device to:
   operate the light emitters and light detectors;
   establish a baseline of light detected by the light detectors in the absence of an object on the screen and in the absence of a cover on the electronic device;
   detect a change in the light detected by the light detectors;
   determine if the change in the light detected by the light detectors is an increase in the level of light;
   if the change in detected light is an increase, determine if the increase is due to a cover being placed on the electronic device; and
   if the increase is due to a cover being placed on the electronic device, initiate entry of the at least one electronic device into a power savings mode.

6. The non-transitory computer-readable media according to claim 5, wherein the instructions further cause the at least one electronic device to:
   determine if a predetermined number of light detectors detected an increase.

7. The non-transitory computer-readable media according to claim 5, wherein the instructions further cause the at least one electronic device to:
   determine if the increase was detected for at least a predetermined amount of time.

8. The non-transitory computer-readable media according to claim 5, wherein the instructions further cause the at least one electronic device to
   determine if a predetermined number of light detectors detected an increase; and
   determine if the increase was detected for at least a predetermined amount of time.

9. A system for formatting and displaying content on an electronic device comprising:
   a memory that includes instructions for operating the electronic device;
   an orientation sensor;
   a display screen;
   a plurality of light emitting devices arrayed on the display screen;
   a plurality of light detecting devices arrayed on the display screen opposite the light emitting devices; and
   control circuitry coupled to the memory, coupled to the plurality of light emitting devices, coupled to the plurality of light detecting devices, and coupled to the display screen, the control circuitry executing the instructions and is operable to:
   detect a first orientation of the electronic device using the orientation sensor;
   operate the light emitters and light detectors;
   establish a baseline of light detected by the light detectors in the absence of an object on the screen and in the absence of a cover on the electronic device;
   detect a change in the light detected by the light detectors;
   determine if the change in the light detected by the light detectors is an increase in the level of light;
   if the change in detected light is an increase, determine if the increase is due to a cover being placed on the electronic device; and
   if the increase is due to a cover being placed on the electronic device, initiate entry of the at least one electronic device into a power savings mode.

10. The system according to claim 9, wherein the control circuitry executing the instructions and is further operable to:
    determine if a predetermined number of light detectors detected an increase.

11. The system according to claim 9, wherein the control circuitry executing the instructions and is further operable to:
    determine if the increase was detected for at least a predetermined amount of time.

12. The system according to claim 9, wherein the control circuitry executing the instructions and is further operable to:
    determine if a predetermined number of light detectors detected an increase; and
    determine if the increase was detected for at least a predetermined amount of time.

* * * * *